United States Patent Office 3,464,925
Patented Sept. 2, 1969

3,464,925
HYDRAULIC FLUIDS CONTAINING AMINO-TRIOLS AND DERIVATIVES THEREOF
Odile Benoit and Francois Giolito, Lyon, France, assignors to Progil, Paris, France, a corporation of France
No Drawing. Filed Sept. 30, 1966, Ser. No. 583,426
Claims priority, application France, Oct. 15, 1965, 46,484
Int. Cl. C10m 1/32; C09k 3/00
U.S. Cl. 252—77                                  2 Claims

ABSTRACT OF THE DISCLOSURE

The use of aminotriols of the formula

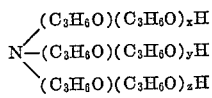

wherein $x+y+z$ is from 9–57, as hydraulic fluids or as essential ingredients therein.

---

This invention relates to new compositions usable as hydraulic fluids. It is concerned more particularly with the use of certain amino-alcohols and esters thereof as the main constituents of transmission fluids and, especially, of fluid for hydraulic brakes.

It is known that severe standards are set for hydraulic fluids. They must have a high boiling point and a high flash point, a good stability to heat and cold, an a viscosity adapted to the elements of the circuits using them and varying very little with temperature. In addition, they must have a good lubricating power, an excellent compatibility with any organic liquid used as diluent, and a high degree of inertness to parts made of metal, plastic material or elastomers which are in contact with the hydraulic fluid.

It has been proposed to use polyalkylene glycols, monoethers of polyalkylene glycols, condensation products of alkylene oxides with fatty acids or alkylene glycols, liquid polyolefines, and organic derivatives of phosphorus, as hydraulic fluids for hydraulic brakes.

It has now been found that certain condensation products of tertiary amines and alkylene oxides combine the required qualities as set forth above and form, either alone or in admixture with known hydraulic fluids, excellent power transmission fluids.

The present invention provides new hydraulic fluids comprising a compound of the formula:

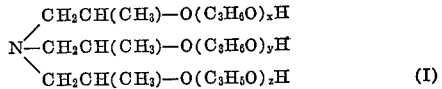

in which $x$, $y$ and $z$ are integers such that the sum of $x+y+z+3$ (referred to later herein as N) is at least 12, or an ester of such a compound with an aliphatic or aromatic carboxylic acid. Although there is no upper limit for N, it is preferably from 12 to 60. N is used as a symbol to designate the total number of —$C_3H_6O$— groups in the product. The exact values of $x$, $y$ and $z$ in the products formed cannot be determined with certainty. Suitable esters are, for example, the acetates, propionates, succinates, and phthalates.

These compounds are obtained by heating propylene oxide and triisopropanolamine under pressure, in the presence of an alkaline catalyst and optionally a diluent.

The aminotriols of Formula I and their esters are more or less viscous liquids, which, as generally prepared, are yellowish orange in color. Their flash points are generally between 225° and 240° C., and their pour points are below −35° C. Their foaming power is practically zero (according to the ASTM D-892-63 test) and the losses by evaporation, after being heated for 22 hours under the conditions of the ASTM standard D-972-76, are generally below 5% by weight at a temperature of 100° C. and 15% by weight at a temperature of 140° C. Furthermore, as can be seen from the data given below, the viscosity characteristics of these compounds are excellent for hydraulic liquids, and they produce practically no corrosion on metals, even in the absence of any inhibitor.

The aminotriols of Formula I and their esters can be used alone as hydraulic fluids. Nevertheless, it may sometimes be advantageous to use them in combination with the conventional constituents of hydraulic fluids, as for example, polyalkylene glycols, alkyl polyols, monoethers or polyethers of glycols or polyols, oligomers or low polymers of olefines, polyphenyl ethers, alkyl benzenes, and 250–400° C. distillation cuts from petroleum. For example, liquids for hydraulic brakes may comprise polyalkylene glycols or ethers of alkylene or polyalkylene glycols as well as one or more compounds of Formula I and/or esters thereof.

The relative proportions of the aminotriols or esters thereof and of the other constituents of hydraulic fluids can vary within wide limits in accordance with the application under consideration. Generally, however, such fluids will contain 10 to 90% by weight of the aminotriols or esters thereof based on the total weight of the mixture.

The new hydraulic fluids may contain small quanities of conventional additives, such as corrosion inhibitors, anti-oxidants, and anti-wear agents.

The following examples which illustrate the preparation and use of the new hydraulic fluids are illustrative only and should not be construed as limiting the scope of the invention.

Examples

Aminotriols of Formula I, in which N had values from 12 to 40, were prepared by causing 9 to 37 mols of propylene oxide to react with 1 mol of triisopropanolamine, in an autoclave at 115–125° C., in the presence of sodium hydroxide as catalyst and optionally xylene as diluent.

In addition, acetates of these aminotriols were synthesized by the action of acetic anhydride at 95–100° C. on the condensates obtained above, in the presence of pyridine.

All the products obtained were slightly viscous liquids which were yellowish or yellow-orange in color.

The following characteristics were studied.

(I) *Viscosity characteristics.*—In accordance with the ASTM standard D–341–43, the straight lines representing the variations in viscosity (in centistokes) as a function of the temperature, were plotted for a series of aminotriols of Formula I (A) and their acetates (AA) having different values of N. The slopes of these straight lines were then calculated, and were as follows:

TABLE I

| Value of N | Slope (A) | (AA) |
|---|---|---|
| 12 | 0.78 | 0.70 |
| 20 | 0.69 | 0.625 |
| 30 | 0.62 | 0.60 |
| 40 | 0.60 | 0.58 |

Conventional hydraulic fluids must be modified by the addition of agents for improving the viscosity index in order to be able to present, under the same conditions, slopes which are close to or slightly smaller than 0.7. On the contrary, the fluids of the present invention, particularly for values of N from 30 to 40, have very small slope indices without the addition of any modifier.

The viscosity of mixtures of aminotriols of the invention and certain known diluents for hydraulic fluids, specifically dodecylbenzene and monoethoxy dipropanol, were also studied.

It was found that, in the case of mixtures of aminotriols (A) having $N=20$ and dodecylbenzene (B), even if the proportion of (A) was as low as 45 by weight, the viscosity of the mixture is higher than 4 centistokes at 100° C., as is generally necessary commercially. The viscosity index (measured according to the ASTM standard D-341-43) of the mixtures varied with the content of aminotriol ($N=20$) as follows:

TABLE 2

| Percent of (A) in the mixture of (A)+(B): | Viscosity index |
|---|---|
| 100 | 103 |
| 80 | 100 |
| 60 | 97 |
| 45 | 71 |

For mixtures of aminotriols (A) or of aminotriol acetates (AA) and monoethoxydipropanol (MP), viscosity indices corresponding to the standards generally required were also obtained over a very large range of relative proportions. The following Table 3 shows some of the results obtained.

TABLE 3

| Temperature (° C.) | Required according to SAE J. 70b standard | Viscosity (centistokes) Measured | |
|---|---|---|---|
| | | Mixture I [1] | Mixture II [2] |
| -40 | <1,800 | 1,400 | 1,300 |
| 50 | >3.5 | 7 | 9 |
| 100 | >1.3 | 2.8 | 2.9 |

[1] Mixture I: 30% of (A) (N=40) and 70% of (MP) (percent by weight).
[2] Mixture II: 35% of (AA) (N=20) and 65% of (MP) (percent by weight).

As can be seen from these tables, the polyoxypropylated amines and their acetates of this invention can advantageously be used in hydraulic fluids, e.g., as brake fluids for automobiles. They can also be used to improve the viscosity index of numerous types of hydraulic fluids.

(II) Phenomena of corrosion on metals.—The SAE corrosion test according to the standard J. 70b (paragraphs 3–6) was carried out for a series of fluids in accordance with the invention. The variations in weight observed after the aforementioned test are set out in the following Table 4.

TABLE 4

| Type of metals | Variations in weight (mg./cm.²) | | | Tolerance according to the standard (mg./cm.²) |
|---|---|---|---|---|
| | Product III | Product IV | Mixture V | |
| White iron | +0.04 | +0.03 | -0.01 | 0.2 |
| Steel | -0.04 | +0.01 | -0.02 | 0.2 |
| Aluminium | +0.02 | +0.02 | -0.01 | 0.1 |
| Cast iron | +0.03 | +0.01 | +0.04 | 0.2 |
| Brass | +0.02 | +0.03 | +0.04 | 0.4 |
| Copper | +0.02 | +0.02 | -0.01 | 0.4 |

Product III.—Aminotriol (A) alone (N=40); Product IV.—Aminotriol acetate (AA) alone (N=30); Mixture V.—Mixture of 40% of III and 60% of monoethoxydipropanol.

In addition, examination of the metallic specimens after the tests showed that no pitting could be detected with the naked eye on the surfaces which had come into contact with the products under test. These tests, carried out in the absence of any corrosion inhibitor, clearly show the inert character of the hydraulic fluids of the invention with respect to the metals normally found in hydraulic systems.

It will be obvious to those skilled in the art that various changes may be made without departing from the scope of the invention and the invention is not to be considered limited to what is described in the specification.

What is claimed is:

1. A method of transmitting pressure by use of a hydraulic fluid consisting essentially of at least 10% by weight of a compound selected from the group consisting of
   (a) aminotriols having the formula:

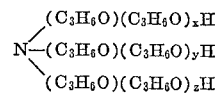

wherein $x$, $y$ and $z$ represent integers, the sum of $x+y+z$ being from 9–57, and
   (b) acetates of said aminotriols.

2. A method of transmitting pressure by use of a hydraulic fluid consisting essentially of at least 10% by weight of a compound selected from the group consisting of
   (a) aminotriols having the formula:

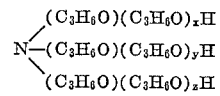

wherein $x$, $y$ and $z$ represent integers, the sum of $x+y+z$ being from 9–57, and
   (b) acetates, propionates, succinates or phthalates of said aminotriols.

References Cited

UNITED STATES PATENTS 3,331,791  7/1967  Cuscurida _____ 260—584 X

LEON D. ROSDOL, Primary Examiner

S. D. SCHWARTZ, Assistant Examiner

U.S. Cl. X.R.

252—51.5; 260—475, 485, 488